United States Patent Office 3,454,303
Patented July 8, 1969

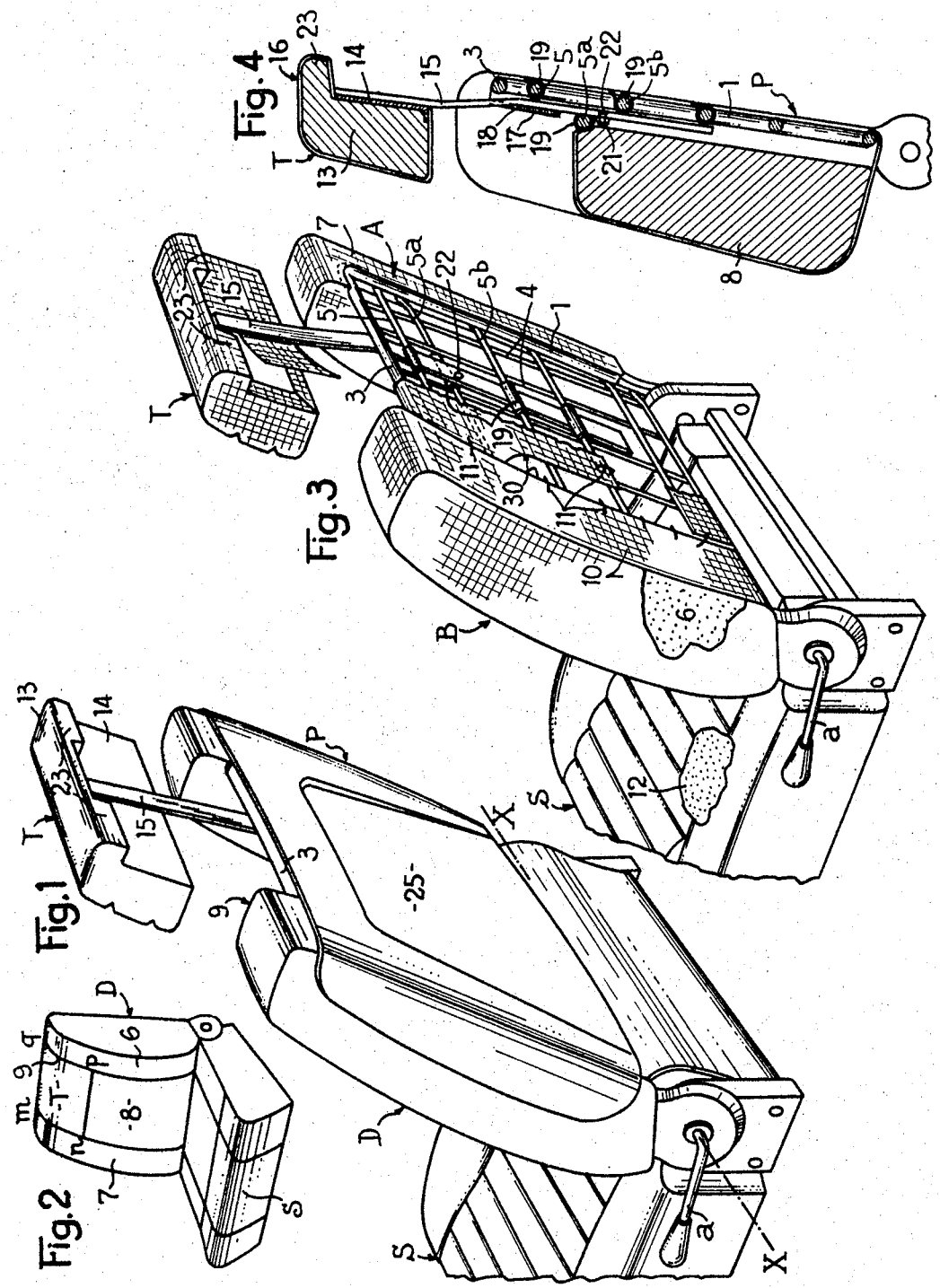

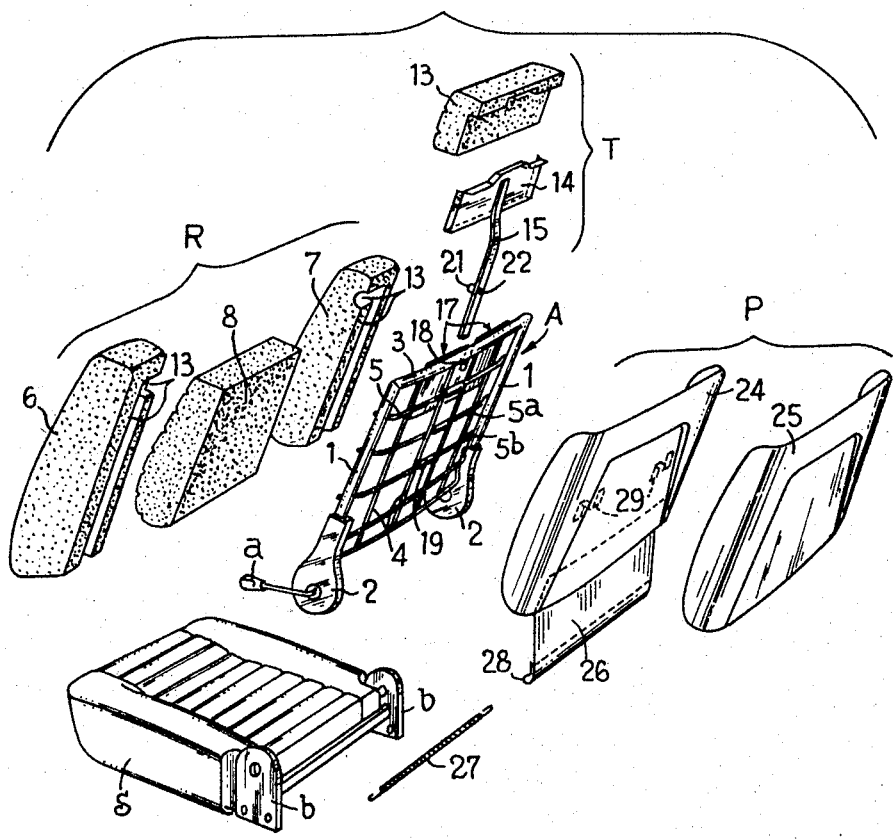
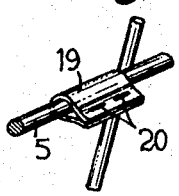
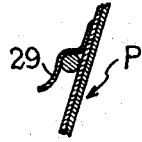

3,454,303
VEHICLE SEATS
Marcel Dangauthier, Paris, France, assignor to Societe Industrielle et Commerciale des Automobiles Peugeot, Paris, France, a French body corporate
Filed July 28, 1967, Ser. No. 656,833
Claims priority, application France, Apr. 12, 1967, 74,721
Int. Cl. A47c 7/36
U.S. Cl. 297—396    6 Claims

ABSTRACT OF THE DISCLOSURE

A back-rest for a vehicle seat or the like having normal height and shapes with conventional padding, said back-rest comprising extending downwardly from its upper edge a medium notch in which a part of the back-rest is movable between a retracted lower position in which this part merely completes the back-rest and corresponds to the appearance of the latter, and one or more upper positions in which this part partly or totally extends out of the notch and performs the function of a head-rest.

---

The present invention relates to seats for automobile vehicles and the like and more particularly to the back-rests thereof.

The main object of the invention is to provide a back-rest for an automobile vehicle seat or the like wherein said back-rest has a normal height shape and the usual padding, said back-rest comprising extending downwardly from its upper edge a median notch in which a part of the back-rest is movable between a retracted lower position in which this part merely completes the back-rest and corresponds to the appearance of the latter, and one or more upper positions in which this part partly or totally extends out of the notch and performs the function of a head-rest.

The back-rest is thus provided with a head-rest which performs its function in the upper position or positions thereof whereas in the retracted lower position it merges with the rest of the back-rest in conforming to the appearance of, and completing the usual shape and contour of, the back-rest and does not obstruct the view of a passenger at the rear.

The movable part forming the head-rest is carried by at least one flexible metal strip which is slidably mounted without play in the reinforcement of the back-rest.

Preferably, the strip is frictionally slidable in a lattic constituting the reinforcement of the back-rest so that the strip is sufficiently held in position for maintaining the head-rest at the desired height corresponding to the height of the user with no need for further means.

A further object of the invention is to provide a seat provided with the aforementioned back-rest.

Further features and advantages of the invention will be apparent from the ensuing description with reference to the accompanying drawing.

In the drawing:

FIG. 1 is a perspective view of the rear of a vehicle seat according to the invention, the head-rest being in its drawn-out upper position;

FIG. 2 is a perspective front view on a reduced scale, the head-rest being in its retracted lower position;

FIG. 3 is a view similar to FIG. 1 with parts of the seat cut away;

FIG. 4 is a diagrammatic longitudinal sectional view of back-rest in a vertical median plane;

FIG. 5 is an exploded perspective view of the various component parts of the seat;

FIG. 6 is a view of a detail of a stop screw which limits the upward travel of the head-rest;

FIG. 7 is a perspective view of a brake pad for braking the strip carrying the head-rest, and FIG. 8 is a sectional view of a detail showing how the rear panel of the head-rest is fixed to the frame of the back-rest.

In the illustrated embodiment, the invention is applied to a seat for an automobile vehicle or the like comprising a seat squab S, and a back-rest D which is mounted on the squab S to pivot about an axis X—X, the inclination of this back-rest being adjustable by any appropriate means having an actuating lever a.

The back-rest D comprises a reinforcement A (FIGS. 3 and 5) consisting of two uprights 1 the lower parts of which are formed in the form of side plates 2 and pivotably mounted by means of journals (not shown) having an axis X—X on plates 6 of the chassis of the squab S. These uprights are interconnected by an upper cross-member 3 so as to form a frame. Fixed to the latter is a welded lattice consisting of bars 4 parallel to the uprights and cross-bars 5, 5ª, 5ᵇ . . . .

This reinforcement A carries a front padding R (FIG. 5) which comprises in accordance with the invention three parts, namely two lateral parts 6 and 7 which extend throughout the height of the back-rest and a lower centre part 8 which is lower than the lateral parts and defines with the latter an upper median notch or recess 9 having a rectangular shape *mnpq* (FIG. 2).

This padding is completed by a front upper median part T which constitutes a head-rest movable between a lower position in which it fills the notch 9 (FIG. 1) and one or more upper positions in which it is partly or wholly drawn out of this notch.

At the rear, the reinforcement A carries a rear panel P.

The front parts of the padding are of a flexible material, for example foam elastomer or the like, disposed in a detachable cover 10 which is secured by fasteners at 11 and constitutes a dust cover of the same kind as the cover 12 fastened to the squab.

Each lateral part 6, 7 of the padding R comprises on the rear face thereof an L-shaped recess 13 adapted to be placed rearwardly over the upright 1 and a part of the upper cross-member 3 of the frame of the reinforcement A.

The part 8 is applied against the reinforcement A and the assembly of the three parts is held against this reinforcement by the detachable cover which passes behind the reinforcement and is secured thereto by fasteners as shown at 11 (FIG. 3).

The head-rest T comprises a block 13 of material or the like, fixed by an adhesive or other means to a support plate 14. The latter is welded to a flexible steel strip 15 and the assembly 13, 14 is covered with a flexible cover 16 forming a hood.

The strip 15 is slidably mounted in the reinforcement A which is so shaped that the strip passes in front of the upper cross-bar 5 behind the immediately lower cross-bar 5ª and in front of the other cross-bars 5ᵇ. Furthermore, it passes behind an upper strip 17 which is secured to the reinforcement and has a notch in the middle thereof at 18 for the passage of the upper part of the strip 15.

Friction means are provided between the strip 15 and the reinforcement A, for example in the form of pads consisting of for example leather sheaths 19 (FIGS. 3, 4, 5, 7) which are tallowed and held by fasteners at 20 (FIG. 7) around the cross-bars 5ª, 5ᵇ in such manner that the strip 15 is sufficiently held in position so that the head-rest T is maintained in opposition to the effect of gravity in the selected adjusted position which depends on the height of the user of the seat.

An abutment, for example consisting of a nut 21 screwed on a screw 22 screwed in the strip 15 (FIGS. 3, 4 and 6), determines the maximum upward displacement of the head-rest T as it abuts the cross-bar 5ᵃ of the reinforcement A.

The strip 15 must have such flexibility as to suitably support in an elastically yieldable manner the head of the passenger in the event of a violent forward or rearward shock.

It will be observed that the rear part of the head-rest T is also padded at 23 so as to protect the rear passenger in the event that this passenger strikes against this head-rest in the raised position of the latter.

The rear panel P of the back-rest comprises a pressed-out embellishing shell 24 (FIG. 5) which is covered with a shaped plastics sheet 25 and provided with a lower screen 26 which is held in position by a spring 27 engaged in a hem 28 and hooked to the plates *b* of the squab chassis. The whole of this panel P is secured to a cross-bar of the reinforcement A by means of two tabs 29 which extend through apertures 30 in the rear wall of the cover 10 of the front padding of the back-rest (see FIG. 3).

The head-rest T could be carried by a plurality of strips 15. The braking of the strip or strips 15 could be effected by means other than pads 19.

Having now described my invention, what I claim as new and desire to secure by Letters Patent is:

1. A back rest for a vehicle seat or the like having normal height and shapes with conventional padding, said back-rest comprising a reinforcement, a median notch extending downwardly from upper edge of the back-rest a back-rest part movable between a retracted lower position in which said part merely completes the back-rest and corresponds to the appearance of the latter, and a plurality of upper positions in which said part extends out of the notch and performs the function of a head-rest, at least one flexible metal strip carrying the back-rest part and being slidably mounted without play in said reinforcement, and rubbing means interposed between the reinforcement and the or each strip for maintaining the head-rest at any height suitable for the height of the user with no need for other means.

2. A back-rest as claimed in claim 1, wherein the reinforcement of the back-rest comprises a lattice structure comprising at least three substantially horizontal members, one of which is located between the two others, said one member being located on one side of said strip and the two other members being located on the opposite side of said strip so that the strip is sufficiently held in position for maintaining the head-rest at any height suitable for the height of the user.

3. A back-rest as claimed in claim 1, wherein said rubbing means comprise tallowed pads which are carried by the reinforcement and against which the strip rubs.

4. A back-rest as claimed in claim 1, comprising abutment means carried by the strip for limiting the upward travel of the head-rest.

5. A back-rest as claimed in claim 1, comprising two lateral padding elements and a median padding element located between the two lateral padding elements and lower than the latter, said notch being located between the two lateral padding elements and being adapted to receive the head-rest, and a common cover fastened to the reinforcement and surrounding the three padding elements.

6. A seat comprising a back-rest having normal height and shapes with conventional padding, said back-rest comprising a reinforcement, a median notch extending downwardly from upper edge of the back-rest and a back-rest part movable between a retracted lower position in which said part merely completes the back-rest and corresponds to the appearance of the latter, and a plurality of upper positions in which said part extends out of the notch and performs the function of a head-rest, at least one flexible metal strip carrying the back-rest part and being slidably mounted without play in said reinforcement, and rubbing means interposed between the reinforcement and the or each strip for maintaining the head-rest at any height suitable for the height of the user with no need for other means.

References Cited

UNITED STATES PATENTS

| | | | |
|---|---|---|---|
| 3,159,427 | 1/1964 | Lawson | 297—410 |
| 3,343,875 | 9/1967 | Ferrara | 297—410 |
| 3,362,746 | 1/1968 | Huyge | 297—344 |

CASMIR A. NUNBERG, *Primary Examiner.*

U.S. Cl. X.R.

297—410

PO-1050
(5/69)

UNITED STATES PATENT OFFICE
CERTIFICATE OF CORRECTION

Patent No. 3454303                  Dated July 8, 1969

Inventor(s) Marcel Dangauthier

It is certified that error appears in the above-identified patent and that said Letters Patent are hereby corrected as shown below:

Column 1, line 6, correct "April 12, 1967" to read

--August 31, 1966--.

SIGNED AND
SEALED

OCT 28 1969

(SEAL)
Attest:

Edward M. Fletcher, Jr.
Attesting Officer

WILLIAM E. SCHUYLER, JR.
Commissioner of Patents